Dec. 20, 1966 H. R. LOBDELL ETAL 3,292,767
PROCESSING MACHINE FEEDING MEANS
Filed Aug. 17, 1964 3 Sheets-Sheet 1
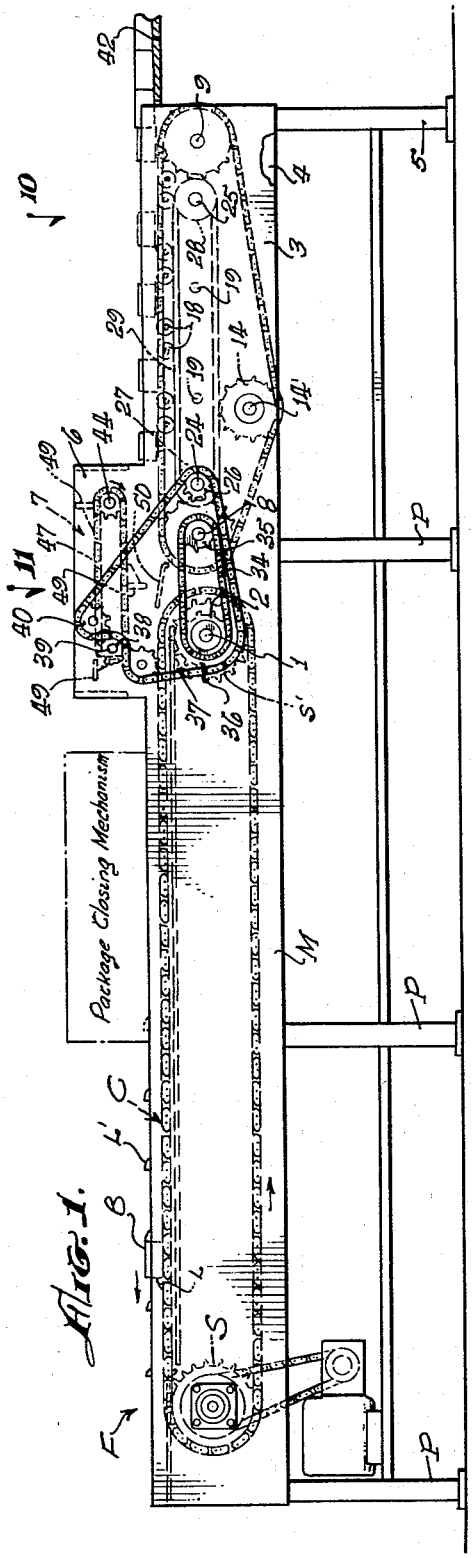
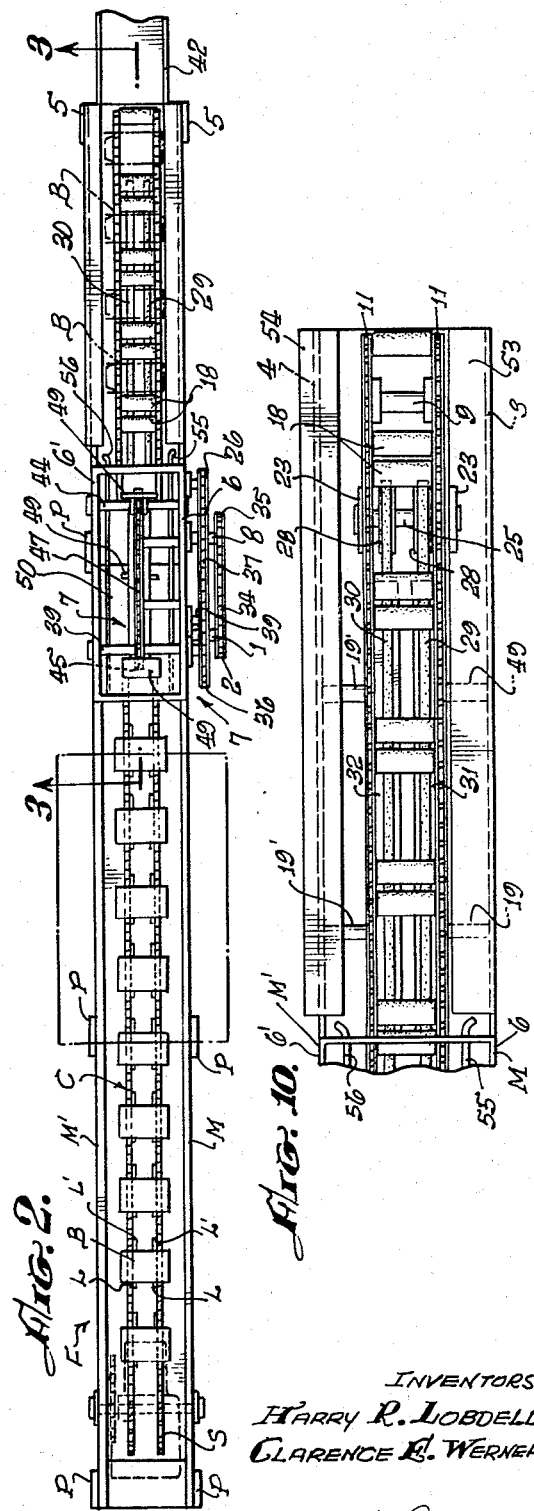
INVENTORS.
HARRY R. LOBDELL,
CLARENCE E. WERNER,
By Harold J. LaVerinte
ATTORNEY.

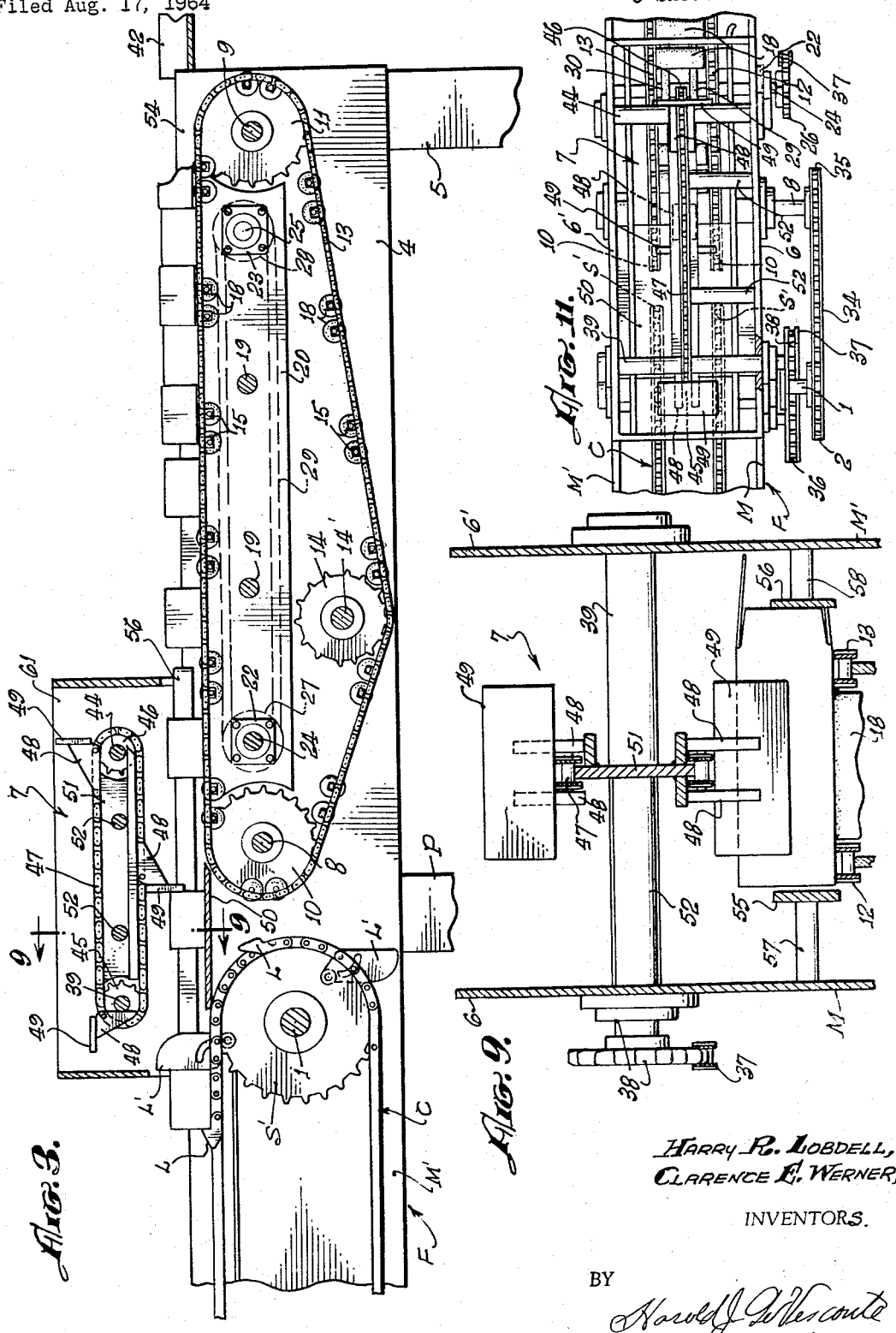

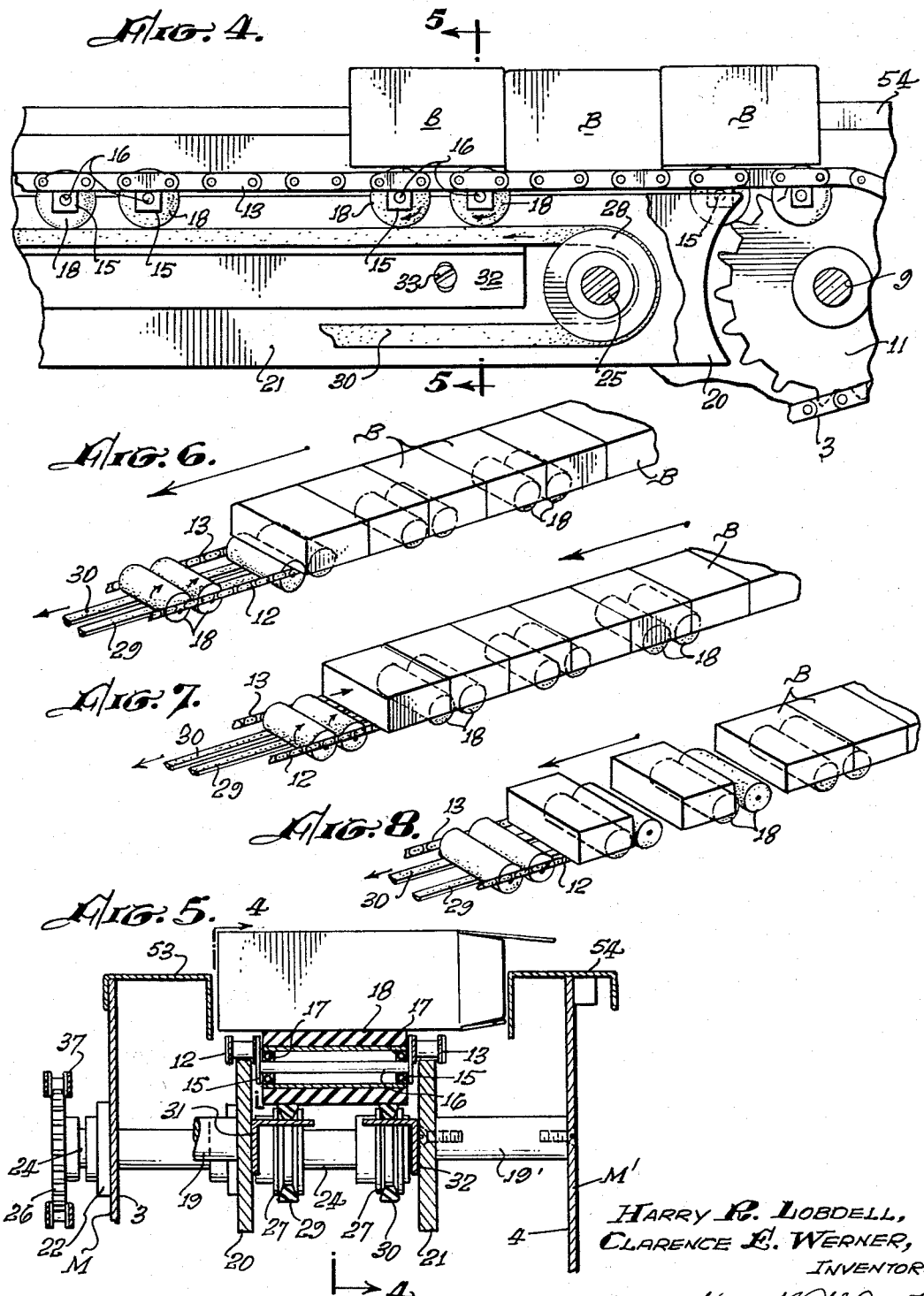

United States Patent Office 3,292,767
Patented Dec. 20, 1966

3,292,767
PROCESSING MACHINE FEEDING MEANS
Harry R. Lobdell, Los Angeles, and Clarence E. Werner, Hermosa Beach, Calif., assignors to Cal Crown Corporation, Los Angeles, Calif., a corporation of California
Filed Aug. 17, 1964, Ser. No. 390,131
6 Claims. (Cl. 198—34)

This invention relates to the art of conveying packages or other units of uniform size and more particularly to a means for receiving such units in delivery thereto at random intervals and multiples in discharging the received units in predetermined spaced relation and timed intervals to a conveyor means on which the units are to be processed. In many packaging machines, it is necessary that the units or packages to be processed be carried in spaced relation on the conveyor means. One type of solution to this problem is to provide machines which take the box or other package forming element from a stack of collapsed elements and erect it for reception of the contents which are then inserted either manually or automatically as the erected box or carton passes a filling station. Other packaging situations demand that the cartons or boxes be filled at one point and be delivered at random rates and intervals to a conveyor type of carton closing machine which, as mentioned above, must necessarily have the carton holding means disposed at regularly spaced intervals along an endless conveyor means. Many attempts have been made to cope with this problem but for the most part, the users of such machines have had to be content with manual supervision over the delivery of the filled but unclosed cartons to the closing machine conveyor and the spaced holding means on the conveyor.

Recognizing the need for a simple, practical, mechanical means for solving this problem, it is the principal object of the invention to provide a package conveyor feeding means adapted automatically to take package units delivered thereto in random quantities and at random time intervals and to deliver them to the spaced package holding devices of the conveyor on a closing machine in a timed relation corresponding to the frequency of the passage of the conveyor package holding means.

Another object of the invention is to provide a package conveyor feeder means of the above character involving only unidirectional moving components.

A further object of the invention is to provide a conveyor feeding means in which the foregoing objectives are realized in practice, which is simple in construction and reliable in operation.

With the foregoing objects in view, together with such additional objects and advantages as may subsequently appear, the invention resides in the parts and in the construction, combination and arrangement of parts described, by ways of example, in the following specification of a presently preferred embodiment of the invention, reference being had to the accompanying drawings which form a part of said specification and in which drawings:

FIG. 1 is a side elevational view of a device constituting a presently preferred embodiment of the invention attached to the package receiving end of a package closing machine which includes a unidirectionally moving package carrying conveyor, FIG. 2 is a top plan view of the machine shown in FIG. 1, FIG. 3 is an enlarged fragmentary section taken on the line 3—3 of FIG. 2, FIG. 4 is an enlarged fragmentary section taken substantially on the line 4—4 of FIG. 5, FIG. 5 is a fragmentary sectional view taken on the plane of the line 5—5 of FIG. 4, FIGS. 6, 7 and 8 are schematic illustrations showing the mode of operation of the device, FIG. 9 is an enlarged transverse sectional view taken on the line 9—9 of FIG. 3, the transfer conveyor being further advanced than shown in FIG. 3, FIG. 10 is a top plan view of the spacing means of the device, and FIG. 11 is a top plan view of the transfer conveyor means.

Referring to the drawings, there is shown in FIG. 2 somewhat schematically a package closing machine comprising a frame structure F supporting an endless conveyor chain means C trained over sprockets S and S' and driven by an electric motor means. One end of the shaft 1 carrying the sprocket S' extends beyond one side of the frame F and said end of the shaft carries a driving sprocket 2 for the present invention and to which further reference will presently be made.

As here shown, the feeding means is incorporated into the package closing machine by extending the frame of the latter, although as the description of the invention proceeds, it will be apparent that the frame structure for the feeding means might be separate and be bolted or otherwise secured to the closing machine frame. Since machines of this character are most generally built to order for particular specific sizes or ranges of sizes of packages, the simpler mode for the construction is that which is here shown and described. While the illustrated embodiment of the machine is one for handling boxes or packages, it will be appreciated as the description proceeds that the principles of the invention are equally applicable to the feeding of any units of suitable uniform configuration to a processing machine involving a conveyor carrying the units to be processed at regularly spaced intervals.

In the illustrated embodiment of the invention, the frame of the closing machine includes spaced side members M and M' supported on posts P. To incorporate the present invention, the members M and M' are longitudinally extended as at 3 and 4 between the rear P of the closing apparatus and the post means 5 at the rear or receiving end of the feeding means. Also the side members are extended upwardly as at 6 and 6' rearwardly of the sprockets S' to support a transfer mechanism or conveyor means generally indicated at 7 and to which further reference will be made.

The frame member portions 3 and 4 at their forward and rearward portions respectively carry transversely extending shafts 8 and 9 each provided with pairs of sprockets 10, 10 and 11, 11 respectively over which chains 12 and 13 are trained with an interposed pair of idler sprockets 14 mounted on a shaft 14' also journaled in and extending between the frame member portions 3 and 4. At uniformly spaced intervals therealong, the adjacent sides of the chains 12 and 13 are provided with links opposite each other having tongues 15 projecting therefrom toward the opposite reaches of the chains, said tongues in the illustrated embodiment (see FIG. 4) being arranged in pairs with one link of the chain disposed between the links carrying the said tongues. Mounted in and extending between the adjacent tongues on the chains are axle pins 16 carrying ball bearings 17, 17 inserted in the ends of rubber faced rollers 18 disposed thereon so that with respect to the upper reaches of the chains 12 and 13 the tops of the rollers 18 are slightly above the plane of the top surfaces of the chains and the spaces at the top surfaces of the chains between the rearmost roller of one pair and the forward roller of the next following pair are usually approximately 1½–1¾ times the dimension of the box, package, or other unit being fed by the feeding means 3 but, in any event, must be less than twice the length of the package or other units.

The side member portions 3 and 4 of the frame structure are provided with opposed, forward and rearwardly inwardly extending bracket elements 19 and 19' which support longitudinally extending plates 20 and 21 disposed, respectively, between the reaches of the chains 12 and 13 and serve to support the upper reaches thereof between the sprockets 10 and 11 of each chain. Adjacent their forward and rear ends, the side member 3 and plate 21 are provided with aligned bearings 22 and 23 in which a forward driving shaft 24 and a rear idler shaft 25 are journaled in parallel relation to each other, the shaft 24 also projecting outwardly from the frame member 3 and carrying a sprocket 26 by which it is driven. Between the plates 20 and 21, the shafts 24 and 25 carry pairs of V-belt pulleys 27, 27 and 28, 28, respectively, over which V-belts 29 and 30 are trained, the upper sides of the upper reaches of the belts 29 and 30 being disposed in close proximity to the lower faces of the rollers 18.

The adjacent faces of the plates 20 and 21 carry longitudinally extending laterally extending supporting means for the under sides of the upper reaches of the belts 29 and 30, said supporting means being shown here as comprising lengths of angle bars 31 and 32 mounted on the plates by a series of screws 33 with the horizontal legs of the angle bars projecting inwardly toward each other and the vertical legs of the angle bars being vertically slotted to afford provision for a slight amount of vertical adjustment as indicated in FIG. 4.

Next, recurring to FIG. 1, the shaft 1 rotates in a counterclockwise direction as viewed in that figure and the sprocket 2 carried thereby drives a chain 34 which is trained around a sprocket 35 on the end of the shaft 8 which protrudes through the frame member 3 and thus drives the sprockets 10, 10 carried thereby with resultant movement of the upper reaches of the chains 12 and 13 from right to left as viewed in the drawings. Between the frame member 3 and the sprocket 2, the shaft 1 also carries a second sprocket 36 which is approximately twice the size of the sprocket 2 and which drives a chain 37 trained under a sprocket 38 on a shaft 39 of a transfer mechanism, thence over an associated idler 40 to give clockwise rotation to the sprocket 38 and shaft 39 and thence around a sprocket 26 fixed to the end of the shaft 24 which protrudes beyond the end of the frame member 3 and thus drives the belts 29 and 30 in the same direction and at a linear speed which is somewhat greater than the linear speed of the chains 12 and 13.

It will be noted that the result of this arrangement of the sprocket chains and belts is such that as the top reaches of the chains are moved from right to left as viewed in the drawings, the belts 29 and 30 are moving in the same direction and at a linear speed, which is preferably, about 50%–75% greater. Since these belts frictionally engage the under sides of the rollers 18, the rollers are given a constant clockwise rotation while traversing the portion of the travel thereof overlying the upper reaches of the belts 29 and 30 such that the surface speed of said rollers in reverse to the bodily forward movement thereof is about 50%–75% less than the linear forward rate of movement of the chains 12 and 13. The result is that as the sprockets carry the rollers forward, the rotation of the rollers while contacting the belts tends to frictionally resist the movement thereon of the boxes or other units B which are being introduced from a reception chute 42 at the right hand end of the feeding means and are being advanced by the chains 12 and 13. As the boxes are carried forward by the chains, the foremost box is carried to a position at which the forward end thereof engages the bights of the chains 12 and 13 between the rearmost roller 18 of one pair and the foremost roller 18 of the next following pair and thus will be carried forward by the chain into the transfer mechanism. This action is repeated as long as the input of packages or boxes by the chains 12 and 13 rearwardly of the point of actuation of the rollers 18 continues to overcome the resistance offered by the rollers 18. The action of the feeding means may be better understood if it is thought of as a condition in which the chains 12 and 13 are moving forward at X feet per minute while the rollers are being so rotated that the surfaces thereof above the chains is given a reverse surface speed of, say x/2 feet per minute so that, in effect, they tend to roll beneath the boxes or packages but at a linear speed less than the linear speed of the chains and thus spacing the boxes or packages as they are transpored by the chains. Thus the boxes, cartons, and packages for which the particular feeding mechanism is designed are delivered by the forward ends of the chains 12 and 13 in predetermined spaced relation defined by the spaces between successive pairs of rollers 18 and since these spaces are of less length than that of two of the units being fed by the device, only a single unit (box or package) can occupy one space without being acted on by the rollers at either end of the space.

The upwardly extending portions 6, 6 of the frame member portions 3 and 4 carry the horizontally transversely extending forward shaft 39 and the parallel rearward shaft 44, the driving sprocket 38 being carried by the shaft 39. Midway between the frame portions 6, 6 the shaft 39 carries a sprocket 45 and the shaft 44, which is an idler shaft, carries an identical sprocket 46. Trained about and extending between the sprockets 45 and 46 is a chain 47 carrying at equally spaced intervals thereon laterally spaced pairs of brackets 48, 48, each pair carrying a package engaging, transversely extending plate 49. The vertical position of the lower reach of the chain 47 is parallel to and above the path of travel of the box B or the like which has been delivered thereto by the chains 12 and 13 and which is moved onto a horizontal platform 50 extending between the side member portions 6, 6. A plate 51 supported by bracket members 52, 52 extending from one of the members 6, 6 is interposed between the upper and lower reaches of the chain 47 as best shown in FIG. 9.

As each box or carton is discharged onto the platform 50, the next plate 49 carried by the chain 47 swings downwardly behind it and moves the carton or box along into position to be engaged by the carton or box engaging means of the packaging machine here shown as the forward lug L and the rear lug L', the rear lug being rocked into position by engagement with the stationary rail means adjacent to the path of travel of the lug in a manner generally similar to that disclosed in the patent of Harry R. Lobdell, one of the present applicants, No. 3,138,076, dated June 23, 1964. Since all of the feeding means and transfer devices are driven by sprocket chain means driven by a shaft which is rotating in timed relation to the package closing machine conveyor means, the packages when and as they are delivered by the feeding means above described will be picked up in timed relation by the engaging means of the package closing machine and proceed through the processing stages of that machine without appreciable deceleration or acceleration at any time. It is particularly to be observed that this is accomplished with unidirectional moving means wherefore there are no reciprocating elements to push a box or a package one way or another with the possible chance of the box or package being caught and mutilated in the machine. Moreover, since the handling devices are unidirectional, a much faster rate of handling can be achieved than with any device for a similar purpose employing reciprocating means. Still further, the fact that these means are unidirectional in character avoids necessity of all sorts of cams, levers, cranks and the like which heretofore have been regarded as necessary for the achievement of the results here achieved.

The package units may be held against shifting transversely of their path of travel by any appropriate means as, for example, the guide members 53 and 54 carried, respectively, by the frame member portions 3 and 4 at the opposite sides of the conveyor means comprising the chains 12 and 13, and by the guide plates 55 and 56 carried by brackets 57 and 58 which are secured to and project inwardly from the frame member portions 6, 6 and which guide plates serve to conduct the package units accurately through the transfer conveyor means.

While the illustrated embodiment of the invention relates to packaging machine feeding means, it will be realized that the principles of the invention are not necessarily limited to such use and that the novel principle of the feeding means may be employed with equal benefit to any situation or problem involving the automatic conversion of random transport of similar units to a timed transport thereof in a predetermined spaced and time relation, wherefore, the term "processing machine" has been employed in the claims as the instrumentality to which the feeding means of the present invention is applied. Moreover, while the feeding means of the invention is illustrated as being driven by the processing machine to which it is attached, such connection is not essential so long as means is provided whereby the feeding means and the "processing machine" move in synchronism.

While a presently preferred embodiment of the invention has been described by way of example, it is not to be inferred therefrom that the invention is limited to the precise details thus disclosed, and it will be understood that the invention includes as well, all such changes and modifications in the parts, and in the construction, combination and arrangement of parts as shall come within the purview of the appended claims.

We claim:

1. A feeding means for a processing machine including a transfer mechanism of the type adapted to carry units to be processed through the machine on a conveyor means holding the units to be processed in a predetermined spaced relation to each other incident to the passage thereof through the machine; said feeding means including a supporting frame means, a unidirectionally moving feeding conveyor means having spaced horizontal upper and lower flights carried by the frame structure extending from a point of reception of units to be processed to a point of delivery of received units to the processing machine conveyor means, power means operative to cause said feeding conveyor means to move in synchronism with the processing machine conveyor means, a chute for delivering units to the reception point of said feeding conveyor means in random quantities and at random time intervals, and unit sepacing means associated with the respective spaced horizontal flights of said feeding conveyor means including drivable means thereon spaced apart at substantially equal distances from each other in the direction of travel of said conveyor means and coplanar power means to constantly drive in a reverse direction said drivable means to exert a force on any unit contacted by said drivable means tending to move the contacted unit in a direction opposite the direction of travel of said feeding conveyor means so that only one unit is positioned between adjacent drivable means prior to the passage of the units through the transfer mechanism.

2. A feeding means for a processing machine as claimed in claim 1, wherein the drivable means comprise pairs of horizontal rollers extending transversely between the flights of said feeding conveyor means and in which the pairs of rollers are spaced apart a distance greater than the dimension of the units in the direction of travel through said feeding means.

3. A feeding means for a processing machine as claimed in claim 1, including a platform at the unit delivery point thereof with said transfer mechanism being associated with said platform and moving in synchronism both with said feeding means and the processing machine conveyor means and having unit engaging elements moving in a unit engaging path and operative in the passage of said unit engaging path to transfer a unit delivered to said platform by said feeding conveyor means to the unit holding means of the processing machine conveyor means.

4. A feeding means for a processing machine as claimed in claim 1 in which said feeding conveyor means is provided with pairs of transversely extending rollers disposed apart in the direction of the path of travel of said conveyor means toward the unit delivery point a distance which is greater than the dimension of the units in said direction and in which said rollers are so disposed on said feeding conveyor means that the upper surfaces of the rollers are slightly above the unit supporting surface of said feeding conveyor means.

5. A feeding means for a processing machine as claimed in claim 1 in which said transfer mechanism constitutes an endless member having a horizontal reach disposed above said platform and includes unit engaging means depending from said reach and moving parallel to said platform toward the unit introduction end of the processing machine.

6. A feeding means for a processing machine as claimed in claim 1 in which said power driven means for rotating said rollers includes belt means extending parallel to the unit engaging reaches of said feeding conveyor means and engaging the lower portions of said rollers as they move with said reaches of said feeding conveyor means, said belt means being power driven to move in the same direction as said feeding conveyor means but at a greater linear rate of speed with resultant movement of the unit engaging surfaces of said rollers in a direction opposite to the direction of travel of said feeding conveyor means and at a surface speed not greater than the rate of linear travel of said feeding conveyor means.

References Cited by the Examiner

UNITED STATES PATENTS 1,283,949   11/1918   Stevenson _____ 198—76

FOREIGN PATENTS 81,204   8/1920   Austria.
142,189   3/1961   Russia.

EVON C. BLUNK, *Primary Examiner.*

RICHARD E. AEGERTER, *Examiner.*